July 7, 1970     L. J. WINDECKER     3,519,228
AIRFOIL STRUCTURE
Filed Sept. 29, 1967
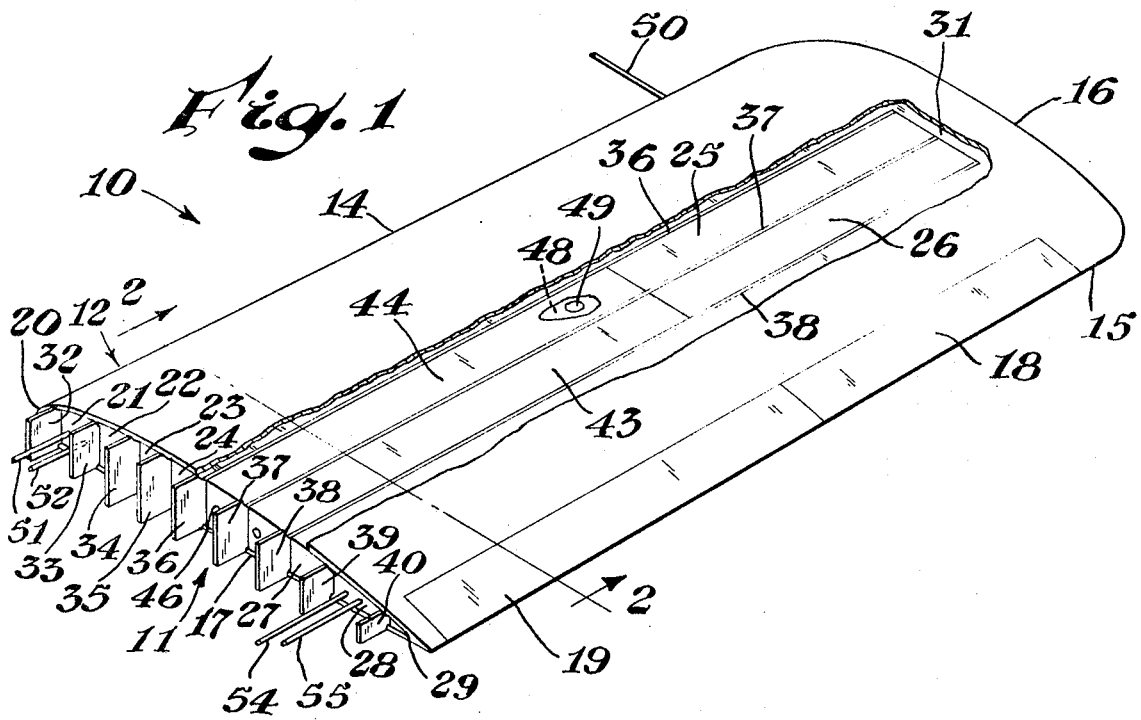
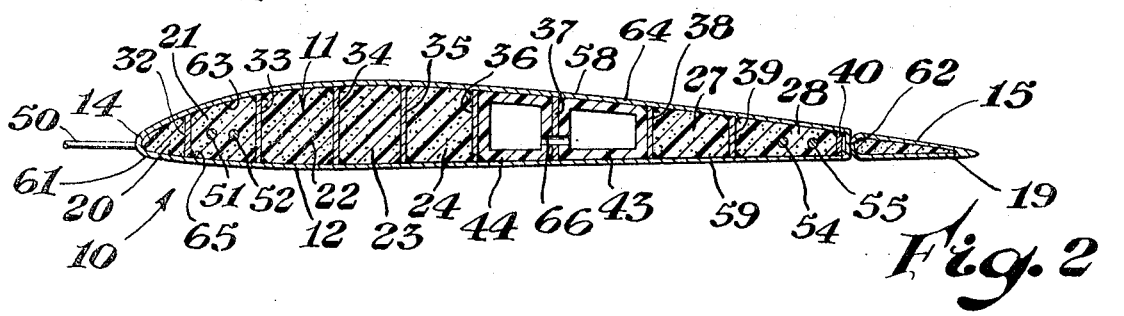
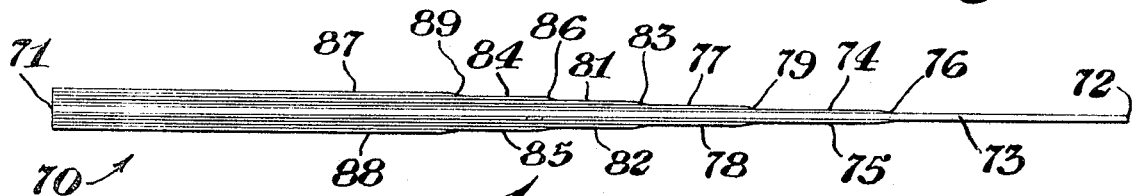
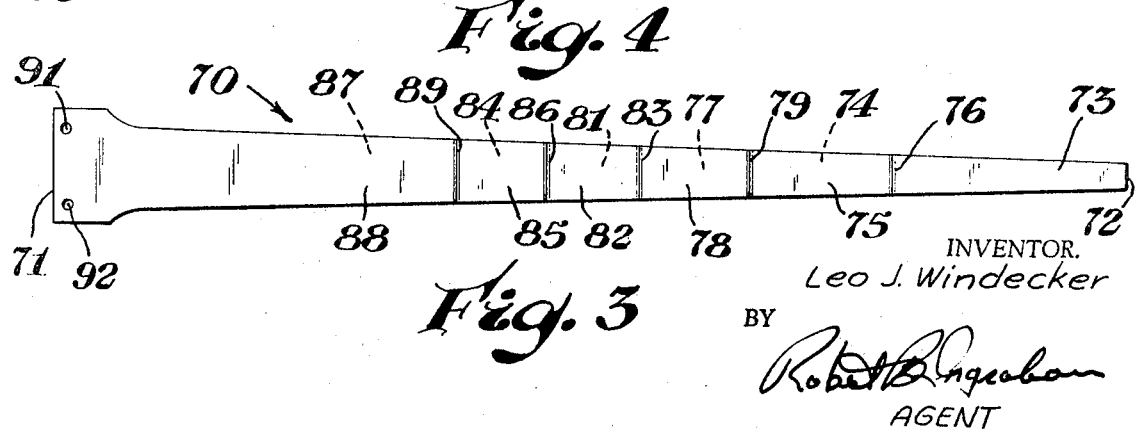
INVENTOR.
Leo J. Windecker
BY
Robert B. Ingraham
AGENT United States Patent Office 3,519,228
Patented July 7, 1970

3,519,228
AIRFOIL STRUCTURE
Leo J. Windecker, Midland, Tex., assignor to The Dow Chemical Company, Midland, Mich., a corporation of Delaware
Filed Sept. 29, 1967, Ser. No. 671,746
Int. Cl. B64c *3/18, 3/24*
U.S. Cl. 244—123    16 Claims

ABSTRACT OF THE DISCLOSURE

An improved airfoil structure is prepared employing a foamed core having a plastic-glass fiber-reinforced skin and spars which are a laminate of reinforced plastic and metal joining the upper and lower surfaces of the skin.

This invention relates to an improved airfoil structure and to a method for the preparation thereof, and more particularly relates to an airfoil structure having increased strength and to a method for the preparation thereof.

In recent years, interest has grown in replacing conventional airfoil structures prepared from wood, fabric or metal with structures of more modern materials, such as filament-reinforced plastics, e.g., glass fiber-reinforced hardenable resins including polyester resins and epoxy resins and foam plastic material which is light in weight. Such materials are not subject to rapid corrosion and deterioration. In my U.S. Letters Patent 3,273,833, an airfoil structure is shown which represents an improvement over a conventional airfoil structure. However, in aircraft, it is very desirable to employ structures which are relatively light in weight and provide the desired rigidity with a minimum weight of material.

It would be desirable if there were available an improved air foil structure and method for the preparation thereof having improved weight, strength and bending frequencies.

It would also be desirable if such an improved airfoil structure and method for the preparation thereof were relatively simple and easily fabricated from readily available materials.

It would also be desirable to provide a composite airfoil structure employing cellular plastic materials wherein advantage is taken of the physical properties of the foam.

These benefits and other advantages in accordance with the present invention are achieved in an aircraft airfoil structure which comprises a cellular plastic core, a plurality of longitudinally extending spar members, a skin, the skin covering the spars and core and being integrally bonded to the core and spars, the airfoil structure having an upper skin portion and a lower skin portion, the spars extending between said upper and lower skin portions.

Also contemplated within the scope of the present invention is a method for the formation of an aircraft airfoil structure comprising providing a plurality of elongate spars having a generally planar configuration, a plurality of cellular synthetic resinous bodies, a skin having an upper airfoil portion and a lower airfoil portion, disposing a cellular synthetic resinous body between adjacent spaced apart spar members, adhering the cellular synthetic resinous bodies to adjacent spars and adhering the skin to the cellular bodies and to adjacent portions of the spar members, thereby connecting the upper skin portion to the lower skin portion by means of said spars and said foam bodies.

Further features and advantages of the present invention will become more apparent from the following specification taken in connection with the drawing wherein:

FIG. 1 is a schematic isometric partially cutaway view of an airfoil structure in accordance with the present invention.

FIG. 2 is a schematic representation of a sectional view of the structure of FIG. 1.

FIG. 3 is a schematic representation of a side view of one of the spars of the airfoil structure.

FIG. 4 is a schematic representation of an edge view of the spar of FIG. 3.

In FIG. 1 there is schematically depicted an airfoil structure in accordance with the present invention generally designated by the reference numeral 10. The airfoil structure 10 comprises a core portion generally designated by the reference numeral 11, a skin portion generally designated by the reference numeral 12. The airfoil structure 10 has a leading edge 14 and a trailing edge 15, a tip portion 16 and a root portion 17. A first control element 18 and a second control element 19 are pivotally affixed to the trailing edge 15 of the airfoil structure 10. The core 11 comprises a plurality of cellular foam plastic elements designated by the reference numerals 20, 21, 22, 23, 24, 25, 26, 27, 28, 29 and 31. The foam plastic element 20 is disposed generally adjacent the leading edge 14; the element 29 adjacent the trailing edge 15 and the elements 22–28 sequentially therebetween. The foam element 31 generally has the configuration of a wing tip and is disposed at the tip portion 16. A plurality of generally planar spars 32, 33, 34, 35, 36, 37, 38, 39 and 40 is disposed in spaced generally parallel relationship and extends from the root portion 17 toward the tip 16. The spars 32–40 lie in generally parallel planes which are generally perpendicular to a plane containing the leading edge 14 and the trailing edge 15. The spars 32 are in alternating relationship with foam plastic elements 20–29 and are adhered thereto. Disposed between portions of the spars 36 and 37 and 37 and 38 are fluid storage or fuel tank elements 43 and 44, respectively. The fuel tank elements 43 and 44 are disposed generally adjacent the root portion 17 and attached to the adjacent spars. The fuel tank element 44 has an outlet passage 46 disposed generally adjacent the root portion 17 and a filling port 48 fitted with a closure 49. The fuel tank elements 43 and 44 optionally are in communication with each other by means of openings therebetween, not shown. A pitot tube 50 is affixed to the leading edge 14 of the wing generally adjacent the tip portion 16 which is in operative communication with conduits 51 and 52 passing through the core 11 generally adjacent the leading edge 14. A first control rod 54 is in operative communication with the control surface 18 and a second control rod 55 is in operative communication with the control surface 19.

In FIG. 2 there is depicted a schematic cross-sectional representation of the airfoil structure 10 of FIG. 1 wherein the reinforced skin is depicted in section. The skin 12 has an upper portion 58 and a lower portion 59 which serve to define a major portion of the upper and lower surfaces of the airfoil structure. The portions 58 and 59 are joined adjacent the leading edge 14 by an edge skin section 61 and adjacent the trailing edge 15 by means of a generally vertically disposed skin section 62. The skin 12 has a core face 63 and an external face 64. The internal face 63 of the core section is adhered to the core to form a unitary structure. The spars 32–40 each extend from the lower portion 59 to the adjacent surface of the upper portion 58 and are adhered thereto. Two fillets 65 are formed adjacent the core face 63 and each of the spars 32–40. The fillets 65 extend longitudinally along the spars and comprise a filamentary reinforcing material encapsulated in a hardened resinous adhesive. A passageway 66 connects the fuel elements 43 and 44 and passes through the spar 37.

In FIGS. 3 and 4 there are depicted schematically a side view and an edge view of an airfoil spar structure in accordance with the present invention generally designated by the reference numeral 70. The spar 70 depicts the general mode of construction of the spars 32–40. The spar 70 is an elongate generally planar element having a first or root end 71 and a second or tip end 72. The spar 70 comprises a first elongate generally planar high strength element 73 having a dimension generally commensurate with the outline of the spar 70. Second and third elongate elements 74 and 75 are adhered on opposite sides of the elongate element 73 and extend from the root end 71 toward the tip end 72 and terminate at a location generally designated by the reference numeral 76. The configuration of the elements 74 and 75 corresponds to the outline of the spar 70 lying between the locations 76 and the root end 71. In a like manner, fourth and fifth high strength laminations 77 and 78 are adhered to the laminations or high strength members 74 and 75 and extend from the root end 71 to a location 79 lying between the locations 76 and the root end 71. Sixth and seventh high strength laminations 81 and 82 are adhered to the laminations 77 and 78, respectively, and extend from the root end 71 to a location 83 lying between the location 79 and the root end 71. Eighth and ninth high strength laminations 84 and 85 are adhered to the elements 81 and 82, respectively, and extend from the root end 71 to a location 86 lying between the locations 83 and the root end 71. Tenth and eleventh high strength laminations 87 and 88 are adhered to the elements 84 and 85 and terminate at a location 89 lying between the location 86 and the root end 71. The root end 71 of the spar 70 defines openings 91 and 92 particularly adapted for attachment to a wing root section affixed to an aircraft fuselage.

Advantageously, in the fabrication of spars and airfoil structures in accordance with the present invention, the elongate spar element such as the element 72 is fabricated from a lightweight metal such as aluminum or magnesium or an alloy thereof and the laminates 74 and 75 are a filament-reinforced plastic composition such as a glass-reinforced epoxy resin. The elements 77 and 78 and 84 and 85 are fabricated from a metal such as that employed for the element 72, and the elements 81, 82, 87 and 88 from glass fiber (beneficially in the form of cloth or roving with the direction of maximum strength corresponding to the major dimension of the spar) reinforced synthetic resin to provide a spar structure having adjacent alternating layers of metal and reinforced hardened resin. If desired the laminated spar is constructed entirely from fiber reinforced hardened resin.

It should be appreciated that in order to illustrate the invention satisfactorily, it is necessary that schematic illustration be employed and the drawing should not be relied upon for proportion.

A wide variety of materials may be employed to fabricate airfoil structures in accordance with the present invention. Beneficially, the foamed elements utilized in the core section are made of a foamed cellular polymer beneficially insoluble in hydrocarbons having a tensile strength of at least 40 pounds per square inch and a compression strength of at least 25 pounds per square inch, and beneficially having a density of less than 3 pounds per cubic foot. For many applications, it is beneficial that the core sections be prepared from cellular polymeric material having a tensile strength between 50 and 75 pounds per square inch, a compression strength of at least about 35 pounds per square inch and a density of less than about 2 pounds per cubic foot. A particularly beneficial cellular polymeric or plastic material is a rigid polyurethane foam. However, other foamed polymers such as polystyrene, phenol-formaldehyde polymers, epoxy resin polymers, as well as foam metals such as aluminum having desired physical properties are also suitable. Generally, the foamed elements for preparation of airfoil structures in accordance with the present invention are prepared by shaping a slab of foam to the desired dimension of the core beneficially by means of a desired abrasive roll, subsequently cutting the core into a plurality of elongate strips corresponding to the foamed elements 20–29 and 31 of FIG. 1, the portion removed corresponding to the control surfaces 18 and 19 and beneficially employed as a core in the fabrication of those elements. The foamed core pieces are then chamfered to provide a configuration corresponding to a desired fillet such as the fillets 65 and channelled to receive conduits and control rods and the like. If long hole drilling equipment is not available, the core piece may be split, groved on one or both faces generated by splitting and the faces joined by an adhesive to form a core piece having a suitable opening or passage therein. Spars such as the spars 32–40 and 70 are prepared by preparing the metallic laminate elements, the non-metallic laminate elements and adhering the elements together.

An alternate method of preparing the spars is to prepare the metallic elements generally equivalent to the elements 73, 77, 78, 81 and 82 and non-metallic elements 87 and 88. The non-metallic elements 74, 75, 81 and 82 are formed by impregnating glass cloth or roving of the desired configuration with a hardening adhesive such as an epoxy resin, curing the resin, laying up the laminate, applying an epoxy resin adhesive to the elements 87 and 88, or alternately, the non-metallic elements may be employed in their uncured form, the laminate formed and subsequently the adhesive hardening resin cured. If desired, the foam plastic elements may be relieved in selected locations for conduits such as the conduits 51 and 52 and the operating rods 54 and 55 and associated operating mechanism, not shown. If desired to incorporate fuel tank elements in the airfoil structure, hollow high strength elements are readily prepared from fiber-reinforced plastic material such as glass fiber-reinforced epoxy resin or metal to provide a shaped container corresponding to the foam plastic element or portion thereof which the fuel element would replace. Beneficially, the skin 12 may be fabricated as an upper portion, a lower portion and a leading edge portion from glass fiber-reinforced synthetic resin such as polyester or epoxy resin in a manner described in my U.S. Letters Patent 3,273,833. The spars and core portions beneficially are assembled and adhered together and the fillets 65 prepared by disposing hardening resin saturated glass roving longitudinally in the grooves formed by the chamfer on the foamed resinous block and the adjacent spar. The prefabricated skin sections are then adhered to the foam elements and to the edges of the spars and fillets. The fillets add substantially to the strength of the structure and employ all components to advantage. The resultant airfoil structure is extremely strong and exhibits desirable characteristics such as low bending frequencies, both natural and torsional, high divergent speed when compared to a wing made by earlier techniques.

As is apparent from the foregoing specification, the present invention is susceptible of being embodied with various alterations and modifications which may differ particularly from those that have been described in the preceding specification and description.

What is claimed is:

1. An aircraft airfoil structure, the airfoil structure comprising
   a cellular plastic core,
   a plurality of longitudinally extending generally planar spar members,
   a skin having upper and lower skin portions, the skin covering the spars and core and being integrally bonded to the core and to the spars,
   the spars extending between and adhered to said upper and lower skin portions.

2. The structure of claim 1 wherein the spars have a generally planar configuration.

3. The structure of claim 2 wherein the foam core is a polyurethane foam.

4. The airfoil structure of claim 2 wherein the spars comprise a plurality of adhered lamina.

5. The airfoil structure of claim 4 wherein the spars consist essentially of a plurality of laminations of metallic and non-metallic high strength elements integrally bonded together.

6. The spar of claim 5 wherein the non-metallic elements comprise a matrix of a hardened synthetic resin and a filamentary reinforcing fiber.

7. The airfoil structure of claim 6 wherein the reinforcing fiber is glass.

8. The airfoil structure of claim 2 wherein the foam core comprises a plurality of elongated shaped thermoplastic elements disposed adjacent to the spars.

9. The airfoil structure of claim 8 including at least one fillet of a hardened synthetic resin having high strength filamentary reinforcing contacting a spar, the skin and a portion of the foamed core.

10. The airfoil structure of claim 2 wherein the spars have edges adhered to the skin, fiber-reinforced resinous fillets extending along the edges of the spars adhered to the spars, the skin and the foam core.

11. The airfoil structure of claim 1 including an integrally bonded container-disposed in at least a portion of a space between adjacent spars.

12. A method for the formation of an aircraft airfoil structure comprising a plurality of elongate spars having a generally planar configuration, a plurality of cellular synthetic resinous bodies, a skin having an upper airfoil portion and a lower airfoil portion, which comprises disposing a plurality of cellular synthetic resinous bodies between adjacent spaced-apart spar members, adhering the cellular synthetic resinous bodies to adjacent spars and adhering the skin to the cellular bodies and to adjacent portions of the spar members, thereby connecting the upper skin portion to the lower skin portion by means of said spars and also by means of said resinous bodies.

13. The method of claim 12 including the step of providing elongate synthetic resinous bodies by shaping the synthetic cellular resinous sheet to an airfoil-like structure, severing the structure to provide a plurality of elongate strips, severing of the structure at locations corresponding to the desired location of the spars.

14. The method of claim 12 including the step of providing the spars by laminating a plurality of metallic and non-metallic high strength elements by means of a hardening adhesive.

15. An aircraft airfoil structure having a tip end and a root end, said structure comprising
 a cellular plastic core,
 a plurality of longitudinally extending generally planar laminar spar members, the spar members tapering in thickness from the root end toward the tip end of the air-foil structure and disposed in spaced generally parallel relationship between the core elements,
 a skin having upper and lower skin portions covering the core portion and the portions of spars disposed between the core elements, the core elements being integrally bonded to adjacent spars and adjacent portions of the upper and lower skin portions, each spar being integrally bonded to the upper skin portion and the lower skin portion.

16. The airfoil structure of claim 15 wherein the generally planar spars are disposed in a plane generally normal to the plane of the airfoil structure.

References Cited
UNITED STATES PATENTS

| 1,507,143 | 9/1924 | Toussaint | 244—133 X |
| 3,028,292 | 4/1962 | Hinds | 244—123 X |
| 3,219,333 | 11/1965 | Derschmidt | 244—133 X |
| 3,273,833 | 9/1966 | Windecker | 244—123 |
| 3,229,935 | 1/1966 | Bellanca | 244—123 |

MILTON BUCHLER, Primary Examiner

J. L. FORMAN, Assistant Examiner

U.S. Cl. X.R.

244—133